March 3, 1970        J. N. KRIEGER        3,498,413

GREASE CUPS

Filed June 20, 1968

INVENTOR
JOHN N. KRIEGER

BY Watson, Cole, Grindle & Watson

ATTORNEYS

United States Patent Office 3,498,413
Patented Mar. 3, 1970

3,498,413
GREASE CUPS
John N. Krieger, Dallas, Tex., assignor to Solotronics Corporation, St. Louis, Mo., a corporation of Missouri
Filed June 20, 1968, Ser. No. 738,455
Int. Cl. F16n 11/04
U.S. Cl. 184—45                    4 Claims

ABSTRACT OF THE DISCLOSURE

A grease cup apparatus for supplying a uniform and continuous flow of lubricant to parts to be lubricated, arranged to be charged with lubricant under high pressure, and designed to prevent an excessive amount of lubricant from entering and damaging the parts in the event charging under pressure is unduly prolonged.

This invention relates generally to grease cups which are used in connection with machinery and equipment whose parts require a continual supply of lubricant and more particularly to an improved grease cup designed to prevent filling of the cup beyond its capacity whereby the machinery and equipment is rendered safe from excess lubricant pressure.

Presently, in the art of grease-delivering devices, the cup or reservoir normally containing a quantity of lubricant had been designed in a manner requiring disassembly from its housing during the refilling operation. Also, such cups relied principally on atmospheric pressure in dispensing the lubricant from the cup into the machine part; for most greasing operations, requiring a lengthy and continued flow, this proved to be inadequate. However, it was not practical to fill such cups by means of a conventional high pressure grease injector or gun since over-lubrication and consequent injury to the machine part was likely in the event of only a slight overfilling of the grease cup container. The expedient of high-pressure grease gun filling, therefore, became undesirable because it required excessive care by the operator.

Years ago, I recognized the need for a grease cup which would facilitate the periodic refilling of its reservoir without the need for disassembly of the cup itself and which required but the minimum of attention from the operator while using lubricant injectors containing high-pressure lubricants. Accordingly, I designed and secured a Mexican patent, No. 70,435, granted July 21, 1964, on a grease cup device which would supply an adequate pressure on the lubricant contained within the reservoir, thereby assuring a positive flow to the parts to be lubricated. This was effected by means of a disc seal and coil spring within the cup, the spring being compressed as grease under pressure was introduced into the cup. Subsequent expansion of the spring would then force the lubricant out of the cup by pushing on the disc seal. My design also included a valve stem secured to the disc, and having thereon a valve head, which head would seat itself when the cup was filled to capacity, against an orifice provided for the stem and serving also as a discharge passage. Although such a grease cup device tremendously enhanced lubricant filling operations for machine parts in need of a positive and continual lubricant pressure, the apparatus was inefficient in its operations. For example, grease flow through the orifice was intermittent and unsteady, while, at the same time, it was observed that delivery of lubricant to the machine part was too slow, even when heavy springs were employed.

In redesigning the old grease cup apparatus, it was found that lubricant, at a higher and more constant pressure is possible if the disc seal is not allowed to wobble as the spring urges same toward the machine part. Accordingly, the clearance around the valve stem has been decreased to guide the stem more accurately, and a plurality of orifices have been provided for releasing lubricant from the device. Moreover, it was discovered that modifying the channel, through which the grease flows after it leaves the reservoir and before it enters the machine part, into a tapered flow channel, acts to compensate for variation in spring pressure as the spring expands.

It is, therefore, the principal object of this invention to improve upon my initial grease cup device by making it more advantageous for use toward a greater variety of lubricant delivering needs.

Another object of the instant invention is to provide a grease cup device which not only prevents the application of excessive pressure to the machine part during filling of the cup from a pressure source, but also permits a steady and continual stream of lubricant to be released from the device at a uniform rate not heretofore possible.

A further object of the present invention is to provide a grease cup device wherein flow rate of lubricant from the device is significantly improved over the prior art devices by decreasing the clearance of the valve stem aperture, providing additional orifices for releasing lubricant from the cup, and tapering the flow channel to thereby compensate for reduction of the force of the spring acting against the lubricant in the reservoir as the spring expands.

Other advantages and novel features of the present invention will become apparent from a detailed description of the invention when considered in conjunction with the accompanying drawings, wherein.

In summary, the instant apparatus consists of a lubricant reservoir or cup made of transparent material; a housing for attaching the cup to a machine part to be lubricated; a disc seal and spring means for forcing lubricant into the bearing or machine part; a grease fitting on the housing for injecting grease into the cup against the seal and spring means; a headed valve stem connected to the disc seal; an aperture for the valve stem; a plurality of grease orifices which are normally open when the spring is expanding and closed by the valve stem head when the cup is filled to capacity; and, a tapered flow channel in the housing between the grease orifices and the machine part connection.

Figure 1:
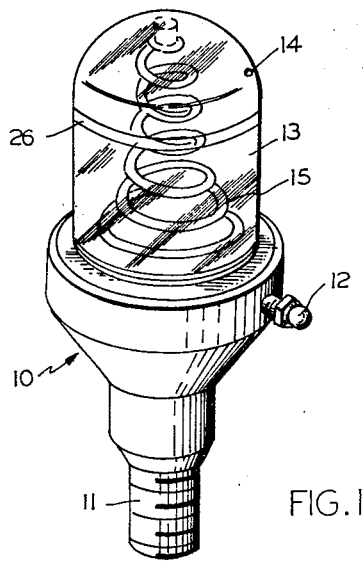
FIGURE 1 is a perspective view of the grease cup apparatus.
Figure 2:
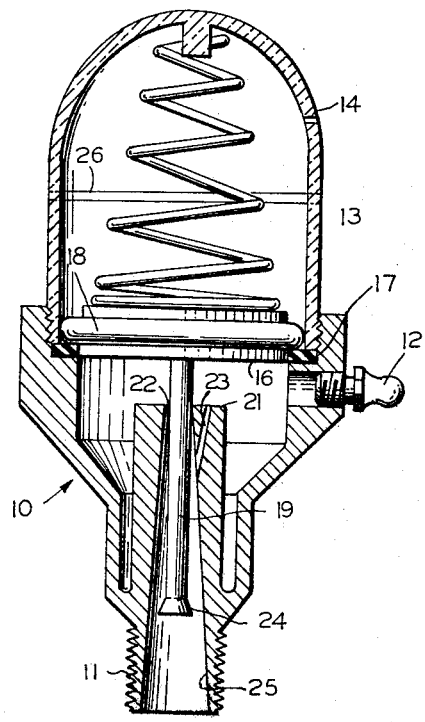
FIGURE 2 is a vertical cross-section of the grease cup showing the control operation of the reservoir with its parts in an "empty receptacle" position.

Referring now to the drawings wherein like characters designate like and corresponding parts throughout the several views and wherein representation of the lubricant, which is normally black, has been omitted for greater clarity of the views, there is shown, in FIGURE 1, a grease cup having a main body portion 10, and a lower portion 11 externally threaded for connection onto a machine to be lubricated. A conventional type grease fitting 12 is provided at the larger diameter of the main body portion for the connection of a high-pressure lubricant injector or gun. The fitting 12 comprises a one-way valve (not shown) which permits the refill of the grease cup by means of a high pressure hose. The main body portion 10 is internally threaded at its upper portion for threaded engagement with a transparent cylindrical reservoir or bell 13 made of plastic or glass closed at its upper extremity and provided with a ventilation port 14 located near the top. A coil spring 15 is attached to the inside of the cup 13 and, as clearly shown in FIGURE 2, depresses a piston 16 against a seal ring 17 when the apparatus is in "empty receptacle" position. The ring 17 may be of neoprene or other similar material for sealing cup 13 when threaded into the main body portion 10. The piston 16 is provided with a peripheral seal 18 of neoprene or similar material for preventing lubricant from passing the piston and contacting spring 15. Also, the neoprene seal insures proper function of the piston 16 within the interior of reservoir 13 and acts to wipe clean its inner surface as the reservoir is being emptied. A valve stem 19 is secured to and depends from piston 16. The piston 16 and seal 18 are hereinafter referred to as a disc seal.

Figure 3:
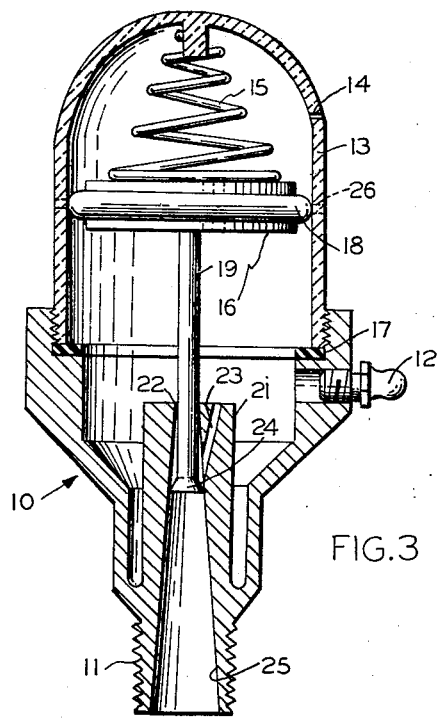
FIGURE 3 is a view similar to FIGURE 2 except that the constituent parts are shown in a "maximum capacity" position.
Figure 4:
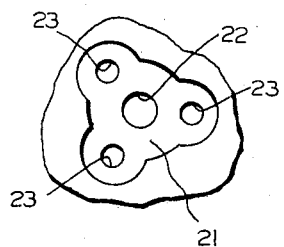
FIGURE 4 is an enlarged partial plan view of the grease cup housing showing the valve stem aperture and the orifices through which grease is delivered from the apparatus to the part to be lubricated.

The main body portion 10 of the grease cup also comprises a housing 21 which is tapered throughout its length and is provided with a valve guide 22 and a plurality of grease orifices 23, most clearly shown in FIGURE 4. Valve guide 22 is dimensioned at its upper end to close tolerance around the valve stem 19, thereby insuring accurate vertical movement of the piston 16 within the grease cup apparatus. The valve stem 19 is provided with a valve head 24 at its free end which seats itself against the inner wall of a tapered channel 25, below the openings of orifice 23 (FIGURE 3) when the grease cup is filled to capacity. The valve stem 19 is of a predetermined length so as to prevent lubricant from being filled beyond a line 26 which is provided around the outer wall of cup 13.

It will be appreciated that by the provision of a plurality of grease orifices 23, discharging into tapered channel 25 below the upper end of the latter, grease discharge from the cup into the part to be lubricated is restricted primarily by the coaction of the valve 24 and the tapered channel 25, so that the resistance to grease flow is lessened as the coil spring 15 expands.

In operation, a high pressure grease hose is affixed to the grease fitting 12 for insertion of lubricant into the grease cup apparatus. Upon injection, which requires but a few seconds, the piston 16 is raised from its position of FIGURE 2 to that shown in FIGURE 3, by the lubricant pushing against the under side of disc seal 18 against the force of coil spring 15. The pressure hose is immediately removed as soon as the grease level reaches line 26, as shown in FIGURE 3. When this capacity condition is reached, the valve head 24 of stem 19 will have seated itself against the inner wall of tapered flow channel 25 to thereby prevent lubricant from entering the channel because the orifices 23 are now blocked. Should the operator inadvertently maintain pressure in the apparatus through fitting 12, the machine parts to which the apparatus is connected will not be in danger of damage through over-lubrication because passage of lubricant from the apparatus through the orifices 23 has been interrupted. After the pressure hose has been removed and the apparatus filled to capacity, the lubricant is urged through orifices 23 by the force of spring 15. Springs of different tensions may be used to accommodate various types of lubricants necessary for any desired lubricating operation. The taper in channel 25 may be so designed as to compensate almost entirely for reduction in pressure exerted by the coil spring as the spring expands. For example, with a properly designed tapered flow channel, it has been found that a mere 5% variation in rate of lubricant discharge occurs as the spring expands from its fully compressed to its fully expanded condition. It has also been found that an apparatus of this type will take up to 12,000 p.s.i. of pressure before exploding.

From the above, therefore, it can be seen that a grease cup has been designed which is simple, efficient, inexpensive and requires a minimum of moving parts. Over-lubrication of machine parts to which the device is attached is not possible with the instant design because of a valve head which blocks the flow of lubricant when the apparatus is filled to its capacity. Also, dispensing of the lubricant from the apparatus is achieved in a more efficient manner than in prior devices since the separation of the grease orifices from the valve guide permits a close tolerance of the guide around the valve stem and thereby minimizes uneven movement of the piston and valve within the cup. In addition, the tapered channel permits a much more uniform flow rate as compared to that afforded by a cylindrical discharge channel.

Obviously many modifications and variations of the present invention are possible in the light of the above teachings.

What is claimed is:
1. An apparatus for supplying a steady and continual flow of lubricant to parts intended to be lubricated comprising:
   an open ended body portion having a first end for storing lubricant and another smaller end for attaching the apparatus to parts in need of lubrication;
   said body portion having a lubricant passage therethrough for conducting lubricant from said first end to said smaller end, said passage including tapering channel means enlarging in the direction of lubricant flow;
   a cup-like lubricant container mounted with its open end in communication with said body portion first end;
   a piston having a peripheral seal within said container movable toward said body portion;
   a valve stem secured to said piston and extending within said lubricant passage, said stem having a headed portion movable within said tapering channel means to vary the transverse sectional area of the latter;
   spring means within said container between its closed end and said piston thereby urging said piston and stem toward said smaller end of said body portion;
   grease fitting means located on said body portion near said first end so that grease inserted therethrough will fill said container by moving said piston against said spring means whereby, after insertion of the lubricant into the apparatus is completed, said spring means will force the lubricant through said tapering channel means out of said smaller end of said body portion in a steady, substantially constant stream into the parts to be lubricated.

2. The apparatus of claim 1 wherein said stem is of such length that its headed portion seats in said tapering channel means to block lubricant flow through the latter when the apparatus is completely filled with lubricant, thereby to prevent the over-lubrication of the greased parts in the event the apparatus is charged with lubricant beyond its capacity.

3. The apparatus of claim 1 wherein said peripheral seal comprises a neoprene ring at the periphery of said piston in order to insure a smooth movement of said piston within said container and to wipe clean the inner well of said container as the latter is emptied.

4. The apparatus of claim 1 wherein said container is transparent and is provided with indicia near its closed end which acts as a reminder that the apparatus is not to be filled therebeyond.

References Cited

UNITED STATES PATENTS

| | | | |
|---|---|---|---|
| 1,353,171 | 9/1920 | MacIndoe | 184—45 |
| 1,634,109 | 6/1927 | MacIndoe | 184—45 |
| 1,836,042 | 12/1931 | Schaver et al. | 184—45 |
| 1,891,544 | 12/1932 | Kern | 184—45 XR |
| 1,989,451 | 1/1935 | Hull | 184—45 |

FRED C. MATTERN, Jr., Primary Examiner

MANUEL A. ANTONAKAS, Assistant Examiner